United States Patent
Ge et al.

(10) Patent No.: US 10,090,008 B2
(45) Date of Patent: Oct. 2, 2018

(54) MAGNETORESISTIVE SENSOR FABRICATION

(71) Applicant: Seagate Technology LLC, Cupertino, CA (US)

(72) Inventors: Zhiguo Ge, Edina, MN (US); Shaun E. McKinlay, Eden Prairie, MN (US); Eric W. Singleton, Maple Plain, MN (US); LiWen Tan, Eden Prairie, MN (US); Jae Young Yi, Prior Lake, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/631,372

(22) Filed: Jun. 23, 2017

(65) Prior Publication Data

US 2017/0294199 A1      Oct. 12, 2017

Related U.S. Application Data

(62) Division of application No. 14/740,116, filed on Jun. 15, 2015, now abandoned.

(51) Int. Cl.
G11B 5/39      (2006.01)

(52) U.S. Cl.
CPC .......... *G11B 5/3912* (2013.01); *G11B 5/397* (2013.01); *G11B 5/398* (2013.01); *G11B 5/3974* (2013.01)

(58) Field of Classification Search
None
See application file for complete search history.

(56) References Cited

U.S. PATENT DOCUMENTS

| | | | |
|---|---|---|---|
| 6,496,335 B2 * | 12/2002 | Gill | G11B 5/11 360/319 |
| 7,220,499 B2 * | 5/2007 | Saito | B82Y 10/00 360/324.11 |
| 7,684,161 B2 | 3/2010 | Pietambaram et al. | |
| 8,514,524 B2 * | 8/2013 | Wu | G11B 5/3163 360/319 |
| 8,531,801 B1 | 9/2013 | Xiao et al. | |
| 8,638,530 B1 * | 1/2014 | Hsu | G11B 5/3912 360/319 |
| 8,743,507 B1 | 6/2014 | Hassan et al. | |

(Continued)

FOREIGN PATENT DOCUMENTS

JP       59136444 A       8/1984

*Primary Examiner* — William J Klimowicz
(74) *Attorney, Agent, or Firm* — Holzer Patel Drennan (57) ABSTRACT

Implementations described and claimed herein include a reader structure, comprising a first reader, including a sensor stack and a top shield structure, the top shield structure comprises a synthetic antiferromagnetic shield (SAF) structure, including a reference layer including at least a layer of NiFe and an impurity additive, an RKKY coupling layer RKKY coupling layer (e.g., Ru layer), and a pinned layer. In another implementation, the RL of the SAF shield structure of a first reader includes at least a layer of amorphous magnetic material. Yet, in another implementation, the SAF shield structure includes an insertion layer of amorphous magnetic material under the SAF shield RL, within the SAF shield RL or between the SAF shield RL and SAF shield Ru.

16 Claims, 6 Drawing Sheets

(56) References Cited

U.S. PATENT DOCUMENTS

| | | | |
|---|---|---|---|
| 8,780,505 B1 * | 7/2014 | Xiao | G11B 5/3909 360/319 |
| 8,780,506 B1 * | 7/2014 | Maat | G11B 5/3932 360/319 |
| 8,797,692 B1 | 8/2014 | Guo et al. | |
| 8,867,175 B1 * | 10/2014 | Lu | G11B 5/11 360/319 |
| 8,873,204 B1 | 10/2014 | Guo et al. | |
| 8,921,126 B2 | 12/2014 | Quan et al. | |
| 8,922,956 B2 | 12/2014 | Lu et al. | |
| 9,165,570 B2 * | 10/2015 | Lu | G01R 33/093 |
| 9,183,857 B2 * | 11/2015 | Zhu | G11B 5/3912 |
| 9,230,565 B1 | 1/2016 | Xiao et al. | |
| 9,230,577 B2 * | 1/2016 | Zhang | G11B 5/3932 |
| 9,251,816 B2 * | 2/2016 | Lapicki | G01R 33/093 |
| 9,437,224 B2 * | 9/2016 | Singleton | G01R 33/093 |
| 9,454,979 B1 * | 9/2016 | Lu | H01L 43/10 |
| 9,659,585 B2 * | 5/2017 | Singleton | G11B 5/39 |
| 2002/0044394 A1 * | 4/2002 | Hasegawa | B82Y 10/00 360/324.1 |
| 2003/0095362 A1 * | 5/2003 | Aoki | B82Y 10/00 360/322 |
| 2004/0190205 A1 * | 9/2004 | Miyauchi | B82Y 10/00 360/324.1 |
| 2007/0188934 A1 * | 8/2007 | Meguro | B82Y 25/00 360/313 |
| 2008/0218910 A1 * | 9/2008 | Kojima | B82Y 25/00 360/319 |
| 2010/0149689 A1 | 6/2010 | Tsuchiya et al. | |
| 2010/0232074 A1 * | 9/2010 | Machita | B82Y 10/00 360/324.11 |
| 2012/0327537 A1 * | 12/2012 | Singleton | G11B 5/3912 360/244 |
| 2013/0293225 A1 | 11/2013 | Singleton et al. | |
| 2014/0042571 A1 | 2/2014 | Gan et al. | |
| 2014/0120374 A1 * | 5/2014 | Zhu | G11B 5/3912 428/811.3 |
| 2014/0151827 A1 | 6/2014 | Zhou et al. | |
| 2014/0218821 A1 * | 8/2014 | Lu | G01R 33/093 360/110 |
| 2015/0102438 A1 | 4/2015 | Gan et al. | |
| 2015/0116868 A1 * | 4/2015 | Lu | G11B 5/11 360/319 |
| 2015/0170686 A1 | 6/2015 | Singleton et al. | |
| 2015/0243307 A1 | 8/2015 | Lu et al. | |
| 2015/0371666 A1 | 12/2015 | Xiao et al. | |
| 2016/0093319 A1 | 3/2016 | Singleton et al. | |
| 2016/0197264 A1 | 7/2016 | Khvalkovskiy et al. | |
| 2016/0365104 A1 * | 12/2016 | Ge | G11B 5/3912 |

* cited by examiner

MAGNETORESISTIVE SENSOR FABRICATION

CROSS-REFERENCE TO RELATED APPLICATION

This application is a divisional application of U.S. application Ser. No. 14/740,116 filed Jun. 15, 2015, the entire disclosures of which are incorporated herein by reference for all purposes.

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disk causes rotation of a magnetization vector of a sensing layer of the MR sensor, which in turn causes a change in electrical resistivity of the MR sensor. The change in resistivity of the MR sensor can be detected by passing a current through the MR sensor and measuring a voltage change across the MR sensor. External circuitry then converts the voltage information into an appropriate format and manipulates that information to recover the information encoded on the disc.

Improvements in magnetic storage media and head technology allow areal recording densities on magnetic discs that are available today. However, as areal recording densities increase, smaller, more sensitive MR sensors are desired. As MR sensors become smaller in size, the MR sensors have potential to exhibit an undesirable magnetic response to applied fields from the magnetic disc. An effective MR sensor may reduce or eliminate magnetic noise and provide a signal with adequate amplitude for accurate recovery of the data written on the disc.

SUMMARY

Implementations described and claimed herein include a reader structure, comprising a first reader, including a sensor stack, and a top shield structure, the top shield structure comprises a synthetic antiferromagnetic (SAF) shield structure, including a reference layer (RL) including at least a layer of NiFe and an impurity additive, an RKKY coupling layer (e.g., Ru layer), and a pinned layer (PL). In another implementation, the RL of the SAF shield structure of a first reader includes at least a layer of amorphous magnetic material. Yet, in another implementation, the SAF shield structure includes an insertion layer of amorphous magnetic material under the SAF shield RL, within the SAF shield RL or between the SAF shield RL and SAF shield Ru.

Other implementations are also described and recited herein.

DETAILED DESCRIPTIONS

There is an increasing demand for high data densities and sensitive sensors to read data from a magnetic media. Giant Magnetoresistive sensors (GMR sensors) that have increased sensitivity consist of two soft magnetic layers separated by a thin conductive, non-magnetic spacer layer such as copper. Tunnel Magnetoresistive sensors (TMR sensors) provide an extension to GMR sensors in which the electrons travel with their spins oriented in a preferred direction across a thin insulating tunnel barrier.

In a TMR sensor, a sensor stack may be positioned between a top shield and a bottom shield. The shields isolate the sensor stack from unwanted electromagnetic interference and yet permit the sensor stack to be affected by magnetic fields of a data bit directly under the sensor.

In the process of fabricating a magnetic sensor that utilizes GMR and/or TMR effects for hard disk drive (HDD) applications, a heat treatment may be used in order to enable proper functionality of the sensor. The heat treatment is performed at an elevated temperature (e.g., a range of 250-350° C.), and can cause degradation in the properties of the materials that are formed on the substrate preceding the heat treatment. Partial loss of antiferromagnetic coupling may be due to the degradation of the interface at an RKKY coupling layer (e.g., Ru layer). The reason for this degradation may be that during the annealing of layers, grain growth (e.g., of NiFe in a layer) induces roughness at this interface causing a variation in the strength of the magnetic coupling across the Ru layer, or it may be a result of a diffusion mechanism.

The technology disclosed herein includes forming a magnetic structure that provides less degradation of the properties of these materials after a high temperature annealing treatment during the reader formation. Specifically, a method of forming a high temperature proof synthetic antiferromagnetic (SAF) shield that biases the side shield of readers is disclosed, such that the side bias from the side shield to the reader can be kept and strengthened after the high temperature annealing. Examples of these magnetic structures, their functionality in sensors, and example operations for manufacturing these magnetic structures are set forth in FIGS. 1-6.

Figure 1:
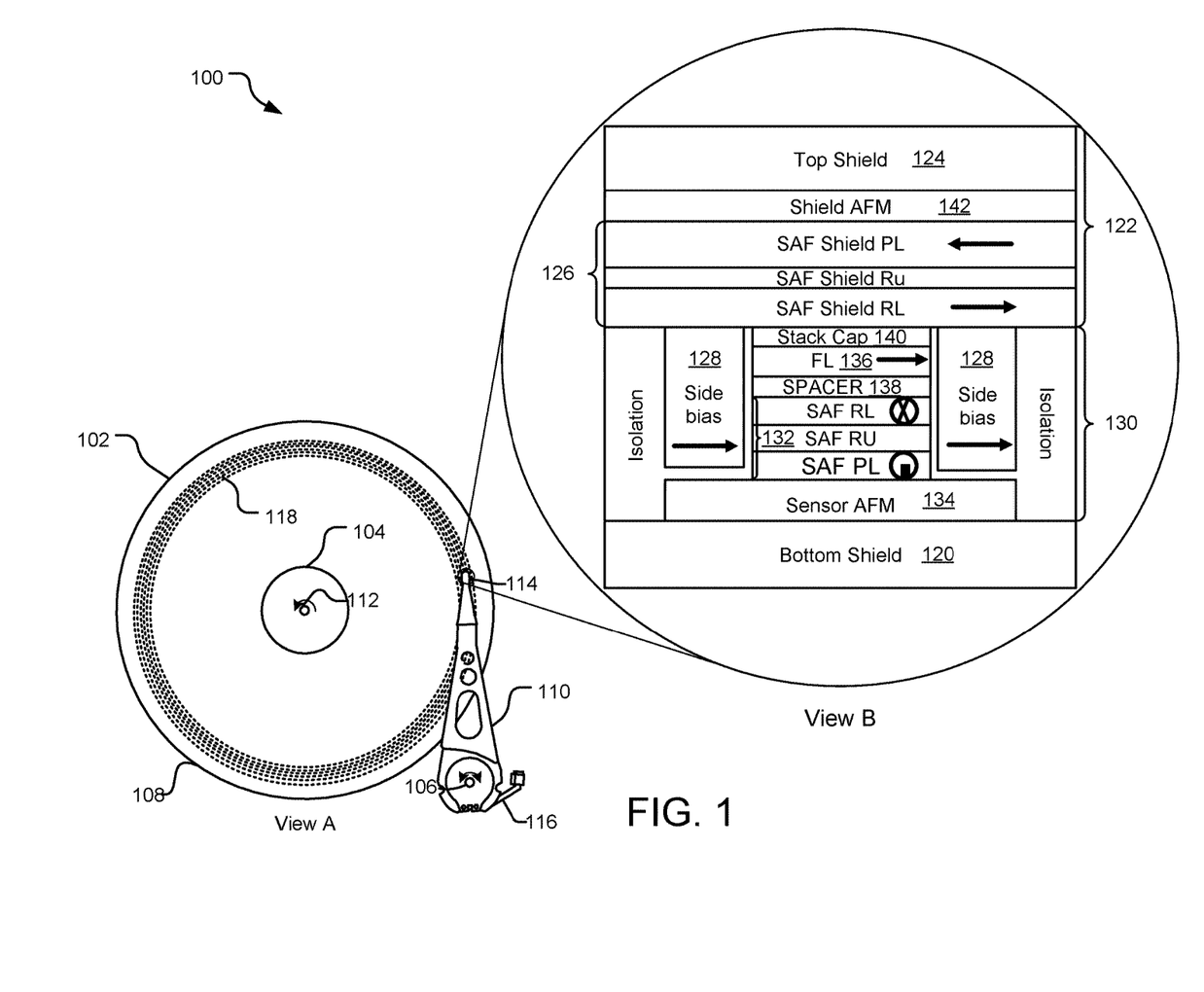
FIG. 1 illustrates a plan view of an example disk drive assembly including a magnetoresistive sensor disclosed herein.

FIG. 1 illustrates a plan view of an example disk drive assembly 100. The example disk drive assembly 100 includes a slider 114 on a distal end of an actuator arm 110 positioned over a media disk 108. A rotary voice coil motor that rotates about an actuator axis of rotation 106 is used to position the slider 114 on a data track and a spindle motor that rotates about a disk axis of rotation 112 is used to rotate the media disk 108. Referring specifically to View A, the media disk 108 includes an outer diameter 102 and an inner diameter 104 between which are a number of data tracks, such as a data track 118, illustrated by circular dotted lines. A flex cable 116 provides the requisite electrical connection paths for the slider 114 while allowing pivotal movement of the actuator arm 110 during operation.

The slider 114 is a laminated structure with a variety of layers performing a variety of functions. The slider 114 includes a writer section (not shown) and one or more MR sensors for reading data off of the media disk 108.

View B of FIG. 1 illustrates the main components of a single sensor reader structure. Along the film growth or z-direction are a bottom shield 120, a magnetic sensor 130 (that utilizes GMR or TMR effects), and a top shield structure 122 (including a top shield 124, a shield AFM layer 142, and a SAF shield structure 126. In some implementations, there may be a non-magnetic low resistivity metal insert (e.g., Ta, Ru, NiCr) between the shield AFM layer 142 and the top shield 124. Layers in the SAF shield structure include, in the following order: a SAF shield pinned layer (PL), a SAF shield Ru layer (an RKKY coupling layer), and a SAF shield reference layer (RL). In FIG. 1, the SAF shield structure 126 is adjacent to a shield AFM layer 142 to pin the magnetic orientation. In another implementation, there may be no shield AFM layer 142 adjacent to the SAF structure 126.

A pair of side bias magnetic tabs or side shields 128 are coupled to the SAF shield structure magnetically. In this single reader formation, the SAF shield structure 126 provides stabilization for the side shields 128. When subjected to a high temperature anneal, the SAF shield 126 can degrade, become unstable, and does not function properly.

A SAF structure 132 can be located between the side shields. The SAF structure may consist of multiple thin ferromagnetic layers, one or more layer pairs being separated by a thin nonmagnetic layer. For example, the SAF structure may include a SAF RL, a SAF coupling spacer layer, and a SAF PL. The SAF coupling spacer layer may be made of material, such as ruthenium (Ru). The SAF PL is a first magnetic layer with inhibited rotation. In View B, the SAF structure is depicted as three layers in the following order: a SAF RL, a SAF Ru layer, and a SAF PL.

On one side of the SAF structure, a sensor AFM layer 134 may be positioned adjacent to the PL of the SAF structure 132 (SAF PL) to prevent it from rotating. On the other side of the SAF structure 132, a FL 136 (a soft magnetic layer that rotates freely in response to an external field) may be positioned near the SAF RL. In some implementations, the FL 136 can comprise of more than one layer. As shown in View B, the FL 136 and a spacer layer 138 are between the side bias layers and adjacent to the SAF structure 132.

A stack cap layer 140 may be an in-situ non-magnetic layer that separates the FL 136 from the SAF shield structure 126. In another implementation, the stack cap layer 140 may be an ex-situ non-magnetic layer. The sensor AFM layer 134 formed under the SAF structure 132 and side shields 128 is adjacent to the bottom shield 120.

The disclosed technology includes strengthening the SAF shield structure to withstand a high temperature anneal treatment, thereby reducing degradation of material properties. A SAF shield structure is formed that includes a SAF shield RL (shown in FIG. 1), which can include at least a layer of NiFe and an impurity additive, an RKKY coupling layer, and a pinned layer. In another implementation, the RL of the SAF shield structure includes at least a layer of amorphous magnetic material. Yet, in another implementation, the SAF shield structure includes an insertion layer of amorphous magnetic material under the SAF shield RL, within the SAF shield RL or between the SAF shield RL and SAF shield Ru.

Figure 2:
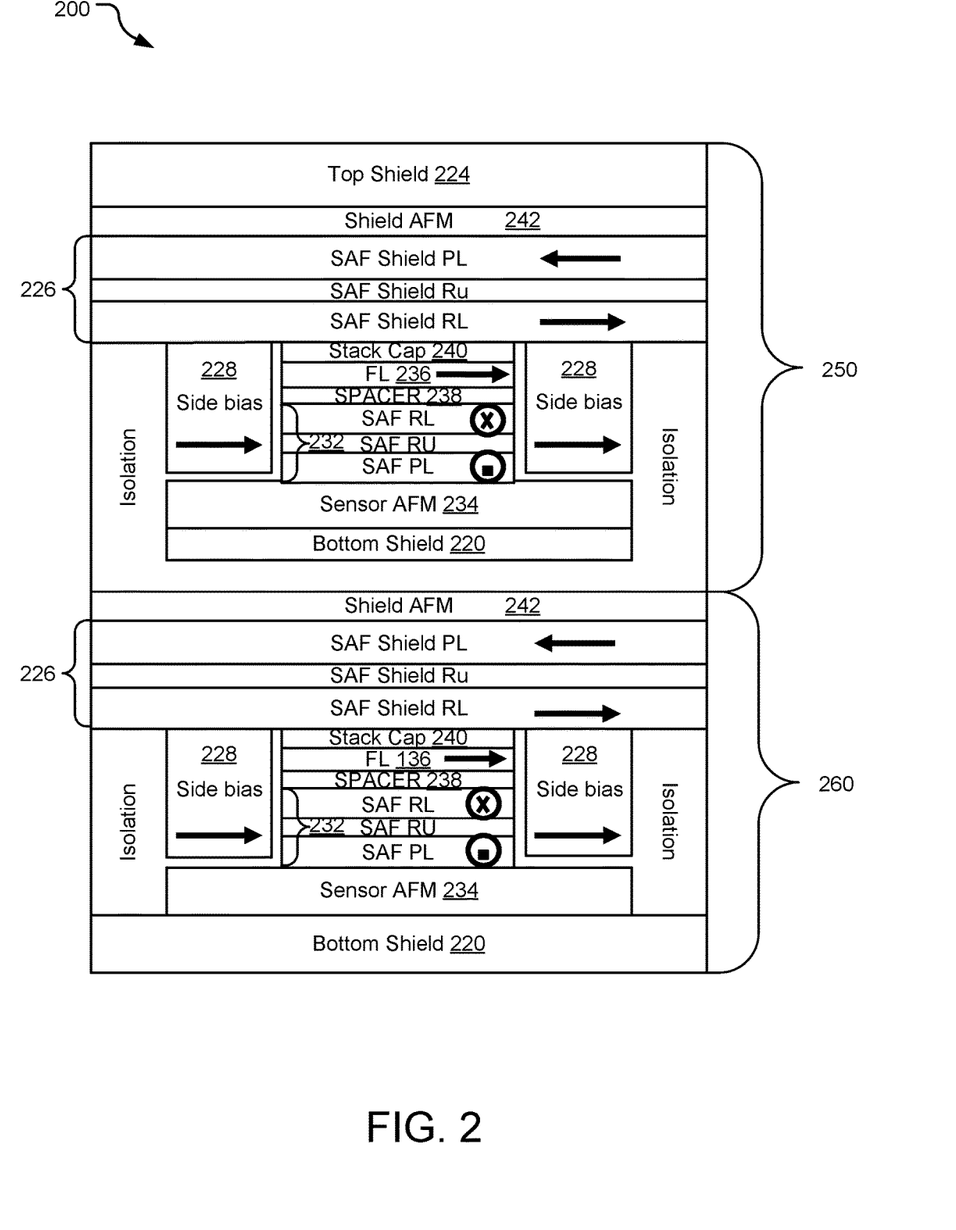
FIG. 2 illustrates an example dual sensor reader structure disclosed herein.

These example layers can also be implemented into multiple sensor devices. FIG. 2 illustrates the main components of a dual sensor reader structure 200, where more than one magnetic sensors are stacked in the z direction. The dual sensor reader structure 200 includes a top shield 224 and two bottom shields 220. Each sensor has a SAF shield structure 226 adjacent to a shield AFM layer 242. In some implementations, there may be a non-magnetic low resistivity metal insert (e.g., Ta, Ru, NiCr) between the shield AFM layer 242 and the top shield 224. In other implementations, there may be no shield AFM layer 242. Layers in the SAF shield structure in FIG. 2 include, in the following order: a SAF shield PL, a SAF shield Ru layer, and a SAF shield RL.

In the dual sensor reader structure shown in FIG. 2, there are two readers 250 and 260. Each reader 250 and 260 has a pair of "side bias" magnetic tabs 228, or side shields, coupled to the SAF shield structure 226 magnetically. Each SAF shield structure 226 provides stabilization for the side shields 228. When this dual reader design is developed, the SAF shield structure on the first reader (e.g., reader 260) may be subjected to a high temperature anneal when annealing the second reader (e.g., reader 250). The SAF shield structure 226 can degrade, become unstable, and not function properly.

In FIG. 2, each reader 250 and 260 includes a SAF structure 232 which is depicted as three layers in the following order: a SAF RL, a SAF Ru layer, and a SAF PL, in both sensors. A spacing layer 238 and a FL 236 may be positioned between the side shields 228, on top of the SAF structure 232. A stack cap layer 240 separates each sensor stack from each SAF shield structure 226. A sensor AFM layer 234 can be formed under the SAF structure and side shields 228. A bottom shield 220 is adjacent to the bottom sensor AFM layer. A bottom shield 220 undergoes a heat treatment that may be necessary for the functionality of the sensor. There is isolation space between the two reader structures.

As described above with regards to the single sensor reader structure in View B of FIG. 1, the SAF shield structure 226 of reader 250, or the SAF shield structures 226 of both readers 250 and 260, in FIG. 2 can also be strengthened to withstand a high temperature anneal treatment, thereby preventing less degradation of material properties. Both of the SAF shield structures 226 can be formed to include a SAF shield RL (shown in FIG. 1), which can include at least a layer of NiFe and an impurity additive, an RKKY coupling layer, and a pinned layer. In another implementation, the RL of each SAF shield structure 226 includes at least a layer of amorphous magnetic material. Yet, in another implementation, the SAF shield structure includes an insertion layer of amorphous magnetic material under the SAF shield RL, within the SAF shield RL or between the SAF shield RL and SAF shield Ru.

In both single sensor devices and multiple sensor reader structures, NiFe and an additive can be added to a SAF shield RL in the SAF shield structures 126, 226 to reduce deterioration of the interface at the RKKY coupling layers of the SAF shield structures 126, 226 which results in partial loss of antiferromagnetic coupling. Tungsten (W) is an example of an additive that can be added to suppress grain growth in the NiFe layer. Other examples include oxygen (O), and metals, such as refractive materials (e.g., tantalum (Ta), nionium (Nb), hafnium (Hf), and zirconium (Zr)).

As provided in FIG. 2, there are two readers in the reader structure. In other implementations, a reader structure can have more than two readers. For example, there may be a reader 270 and a reader 280 (not shown), positioned in the down track direction from the first reader 250 and the second reader 260.

Figure 3A:
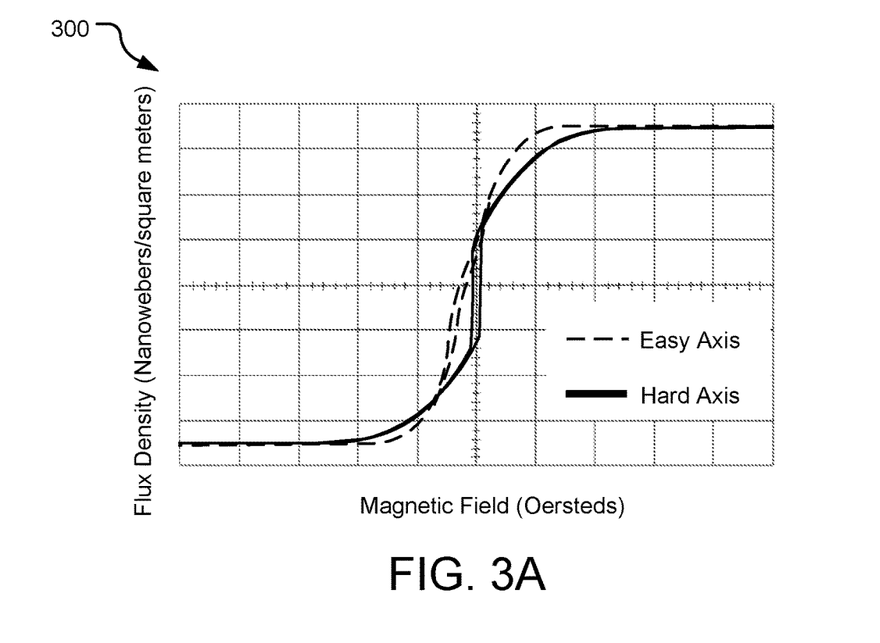
FIG. 3A shows a graph of a magnetization curve of an example SAF shield structure with NiFe in the magnetic material.
Figure 3B:
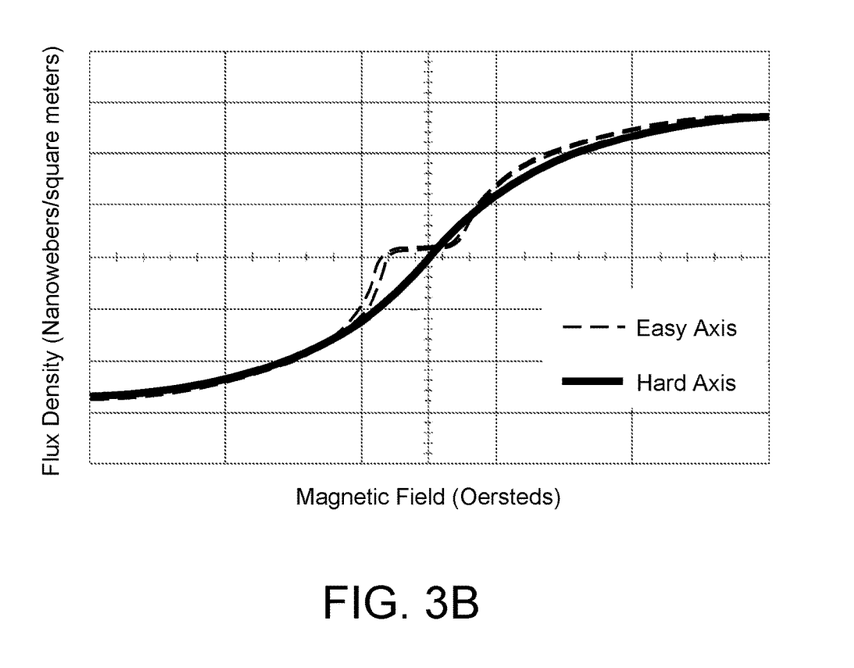
FIG. 3B shows a graph of a magnetization curve of an example SAF shield structure with NiFeW in the magnetic material.

The result of the layer formation with such additives, specifically W in the NiFe layer, is illustrated in FIG. 3B, in comparison to a reader structure without the additives in the layer formation (as shown in FIG. 3A). The two graphs 300 show magnetization curves (or BH loops) of along the easy axis (shown by the dotted line) and a magnetization curve along the hard axis (shown by the solid line) (substantially in the direction orthogonal to the easy axis). The graphs depict values of flux density (along the y-axis) against the field strength (the x-axis). The flux density (measured in nWb/square meters) increases in proportion to the field strength (measured in Oersteds) until it reaches a certain value where it can no longer increase and becomes constant as the field strength continues to increase.

FIGS. 3A and 3B show the response of a SAF shield structure in a reader structure, where the SAF shield structure includes the following layers along a z-direction from bottom up: A_t1/CoFe30_t2/Ru_t3/CoFe30_t4/A_t5/CoFe30_t6/IrMn_t7/Cap. As described here, "A" is used to denote the material for SAF shield RL or PL. A thin CoFe30 layer serves as an interface coupling improvement layer (e.g., thickness of t2 is 1-30 Å). In this implementation, CoFe30 (i.e., 30% Fe) is used. In other implementations, there can be different amounts of CoFe content utilized.

The Ru is the RKKY coupling layer (e.g., thickness of t3 is 0-20 Å). In a nearly balanced SAF shield structure, the thickness of t4 may be close to the thickness of t2, and the thickness of t5 may be close to the thickness of t1. By "close," it is understood as $0.8*t2 \leq t4 \leq 1.2*t2$, and $0.8*t1 \leq t5 \leq 1.2*t1$. However, different thickness ratios between different layers in the SAF shield may be used in different implementations.

FIG. 3A shows magnetic material in one implementation where A=NiFe, after a 295° C. anneal. The signature of the SAF shield structure has been lost as depicted by a stable plateau around 0 magnetic field. These results indicate degraded antiferromagnetic type of coupling through the SAF Ru layer.

FIG. 3B shows magnetic material in one implementation where A=NiFeW, after a 295° C. anneal. As compared to FIG. 3A, the implementation in FIG. 3B shows that the plateau survives the anneal. A plateau represents a stable region within which there is minimal SAF shield response to external magnetic field. The partial loss of antiferromagnetic coupling seen in FIG. 3A may be contributed to the degradation of the interface at the RKKY coupling layer (e.g., Ru layer). The degradation may be a result of grain growth (of the NiFe) inducing roughness at the interface during the anneal causing a variation in the strength, possibly even sign, of the magnetic coupling across the Ru layer. As shown in FIG. 3B, the presence of W (or another additive described herein) reduces the deterioration by suppressing grain growth.

The amount of W used with NiFe can vary in different implementations. For example, in one implementation, to keep a layer magnetic, it may be beneficial to use less W to maintain a relatively high moment for a stable shield, yet enough W to inhibit degradation upon anneal (e.g., 14 atomic % or less of W). In some implementations, more than 14 atomic % of W may yield a non-magnetic layer.

Figure 4:
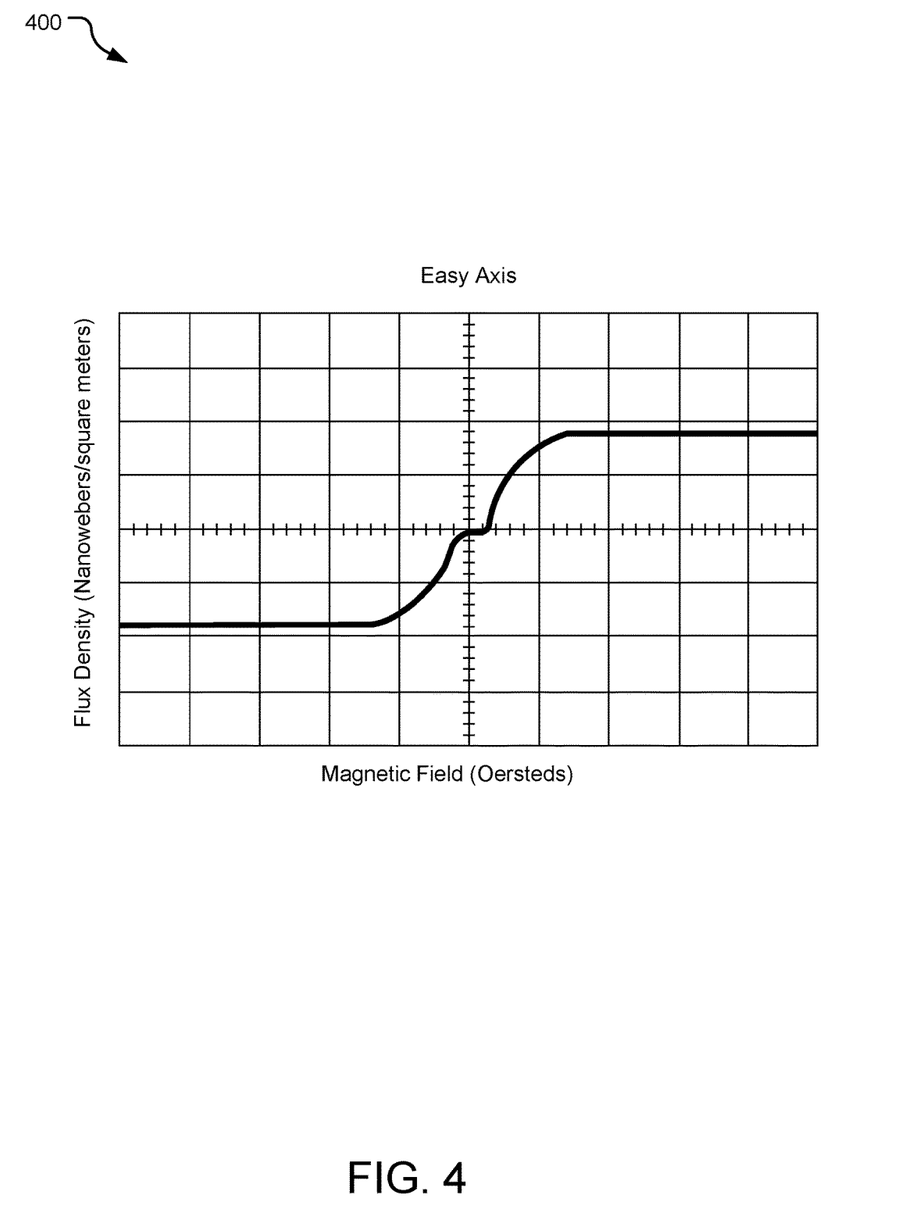
FIG. 4 shows a graph of a magnetization curve of example SAF shield structure with CoFeNiB in the magnetic material.

FIG. 4 shows an implementation using an amorphous magnetic material as "A" (CoFeNiB) in a SAF shield structure after 295° C. anneal. The additive and amorphous magnetic material stabilizes the shields. The graph 400 shows a magnetization curve (or BH loop) of a sensor structure along the easy axis (shown by the solid line). The graph depicts values of flux density (along the y-axis) against the field strength (the x-axis). The flux density (measured in nWb/square meters) increases in proportion to the field strength (measured in Oersteds) until it reaches a certain value where it can no longer increase and becomes constant as the field strength continues to increase.

The amorphous magnetic material may be an alloy that includes a ferromagnetic material (e.g., Cobalt (Co), Iron (Fe), CoFe, NiFe, CoNiFe) and a refractory material (e.g., tantalum (Ta), niobium (Nb), hafnium (Hf), and zirconium (Zr)). For example, the alloy may be CoFeX, NiFeX or CoNiFeX, where X comprises at least one of the refractory material elements. As used herein, "amorphous" refers to a solid that lacks the long-range order characteristic of a crystal. The amorphous magnetic material may be deposited as a thin film and remain amorphous during post-deposition processing, such as during a magnetic annealing process.

The alloy may include between 1 and about 30% of the refractory material, or enough to ensure that the alloy is amorphous. Using more than this range can dilute the magnetic moment. In one example implementation, the alloy is CoFeTa and comprises 6-20% Ta. The percent of refractory material included in the amorphous magnetic material is a variable value that may depend upon the refractory material and ferromagnetic material used in such alloy. Depending on the implementation, the magnetization and thickness of "A" can be engineered based on different need.

In the implementation shown in FIG. 4, the A layer comprises CoFeNiB in the SAF shield structure of the following layers: CoFeNiB/CoFe/Ru/CoFe/CoFeNiB/CoFe/IrMn. As shown, when CoFeNiB is used in the SAF shield RL and/or PL, a plateau in the easy axis loop remains after high temperature anneal attesting to less degradation of antiferromagnetic coupling.

Figure 5A:
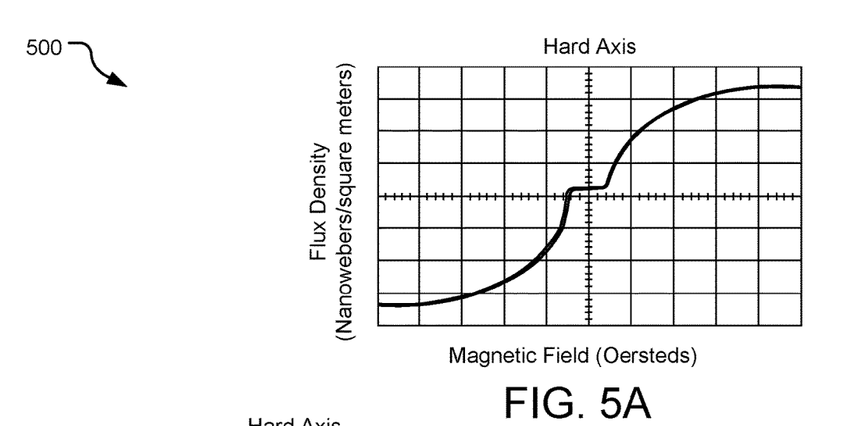
FIG. 5A shows a graph of a magnetization curve of example SAF shield structure with NiFe in the magnetic material and Ta as an insertion layer.
Figure 5B:
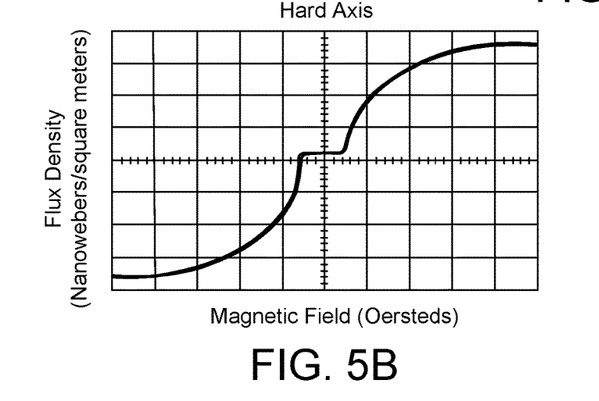
FIG. 5B shows a graph of a magnetization curve of example SAF shield structure with NiFe in the magnetic material and CoFeB as an insertion layer.
Figure 5C:
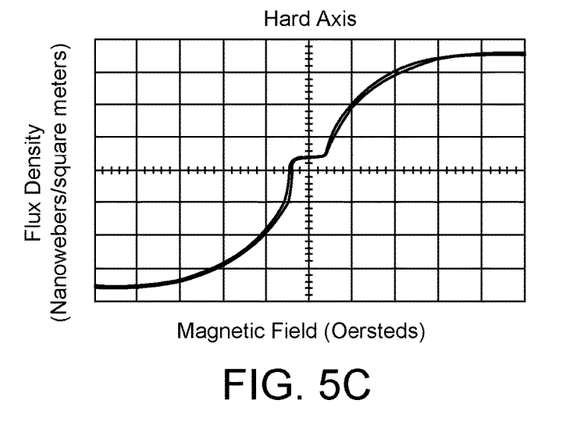
FIG. 5C shows a graph of a magnetization curve of example SAF shield structure with NiFe in the magnetic material and CoFeTa as an insertion layer.

FIGS. 5A-C show graphs 500 showing magnetization curves for reader structures where an amorphous material is used as a thin insertion layer underneath the first "A" layer in a SAF shield structure to provide stabilization for the side shields. FIGS. 5A-C show graphs showing magnetization curve for reader structures with SAF structures after 295° C. anneal. The graphs show a magnetization curve (or BH loop) of a sensor structure along the hard axis. The graphs depict values of flux density (along the y-axis) against the field strength (the x-axis). The flux density (measured in nWb/square meters) increases in proportion to the field strength (measured in Oersteds) until it reaches a certain value where it can no longer increase and becomes constant as the field strength continues to increase.

In FIG. 5A, Ta is the amorphous material used as the insertion in a SAF shield structure of the following layers: Ta/NiFe/CoFe/Ru/CoFe/NiFe/CoFe/IrMn. As shown, when Ta is inserted underneath the SAF shield RL, a plateau in the easy axis loop remains after high temperature anneal attesting to less degradation of antiferromagnetic coupling.

In FIG. 5B, CoFeB is the amorphous material used as the insertion layer in a SAF shield structure of the following layers: CoFeB/NiFe/CoFe/Ru/CoFe/NiFe/CoFe/IrMn. In FIG. 5C, CoFeTa is the amorphous material used as the insertion layer in a SAF shield structure of the following layers: CoFeTa/NiFe/CoFe/Ru/CoFe/NiFe/CoFe/IrMn. As shown, when CoFeB or CoFeTa is inserted underneath the SAF shield RL, a plateau in the easy axis loop remains after high temperature anneal attesting to less degradation of antiferromagnetic coupling. In addition if magnetic materials (e.g., CoFeB, or CoFeTa) other than Ta are used as the insertion layer, the coupling between the SAF structure and other structures (e.g., the side shields) will not be interrupted, and can serve better as sensor stabilization.

Figure 6:
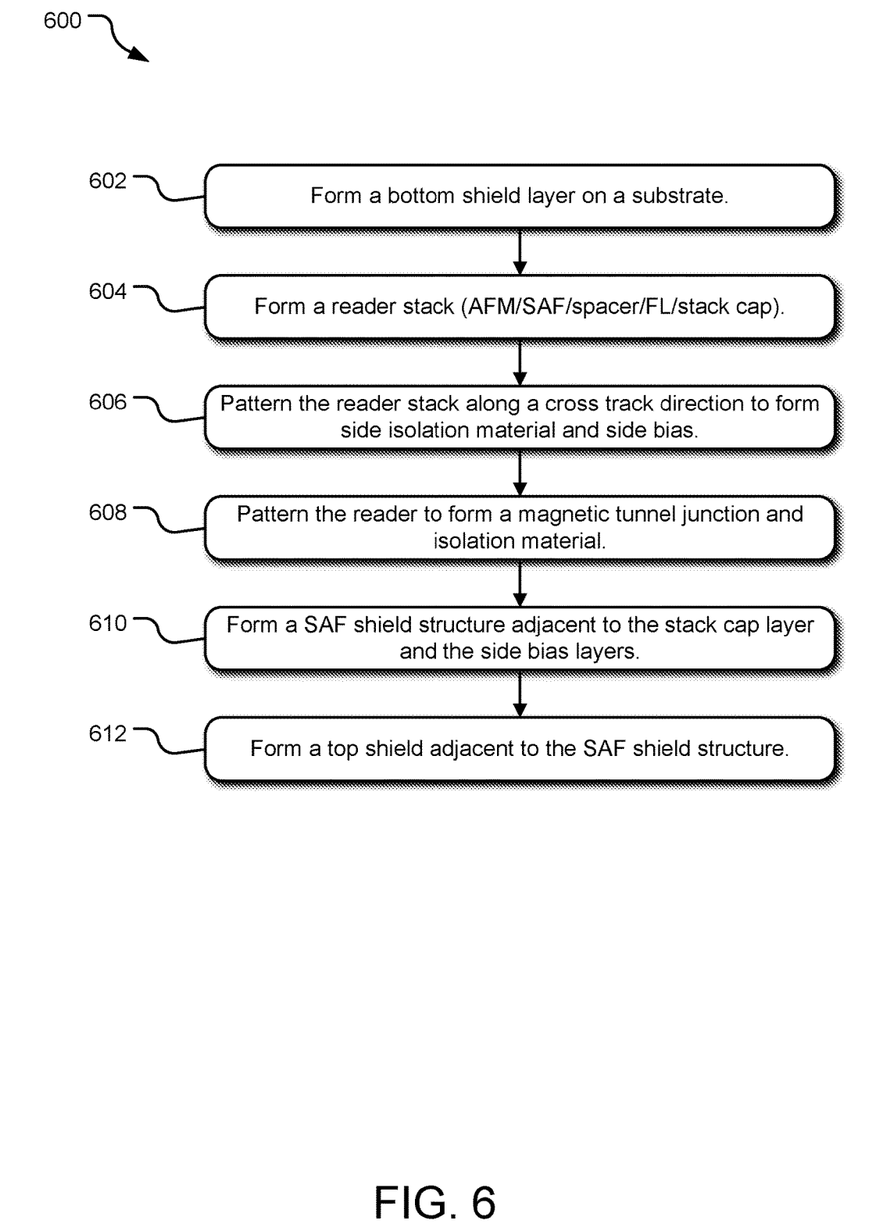
FIG. 6 illustrates example operations illustrating manufacturing an example sensor stack in a magnetoresistive sensor.

FIG. 6 shows example operations 600 of manufacturing an example reader structure. These operations are described for manufacturing a single sensor structure and are also applicable to multiple sensor structures. Layers in the reader structure may be deposited on a substrate by a variety of methods (e.g., sputtering).

In reference now to FIG. 6, a flowchart illustrates operations according to an example embodiment. The procedure involves forming a bottom shield layer on a substrate in a forming operation 602. This need not involve forming the bottom shield directly on the substrate; intervening materials/layers may be disposed between the bottom shield and substrate.

A forming operation 604 forms a reader stack. The reader stack includes an AFM layer, a SAF structure (a SAF PL layer formed adjacent to the AFM layer, a SAF coupling spacer layer formed adjacent to the SAF PL layer, and a SAF RL layer formed adjacent to the coupling spacer layer), a spacer layer formed adjacent to the RL layer of the SAF structure, a FL formed adjacent to the spacer layer, and a stack cap layer formed adjacent to the FL.

A forming operation 606 includes patterning the reader stack in a cross track direction to form an isolation material adjacent to the reader stack and side bias layers next to the isolation material. A forming operation 608 includes additional patterning of the reader stack to form a magnetic tunnel junction and an isolation material adjacent to the side bias layers formed in forming operation 606.

In a forming operation 610, a SAF shield structure is formed on top of the stack cap layer and the two side bias layers. The SAF shield structure can include a SAF shield RL formed adjacent the stack cap layer and the side bias layers. Layers comprising a SAF shield Ru and a SAF shield PL are formed adjacent to the SAF shield RL. The SAF shield RL can include at least a layer of NiFe and an impurity additive, an RKKY coupling layer, and a pinned layer. In another implementation, the RL of the SAF shield structure includes at least a layer of amorphous magnetic material. Yet, in another implementation, the SAF shield structure includes an insertion layer. In one implementation, the insertion layer may comprise an amorphous material including at least one of Ta, CoFeB, and CoFeTa. The disclosed SAF shield RL strengthens the SAF shield structure to withstand a high temperature anneal treatment, thereby preventing less degradation of material properties.

Lastly, in a forming operation 612, a top shield is formed adjacent to the SAF shield structure. There may be other various configurations for the layers formed in a MR sensor stack between a top shield and a bottom shield. For example, there may be a single sensor or multiple sensors in a MR reader structure, requiring formation of only one top shield. In another implementation, there may be a shield AFM layer formed adjacent to the SAF shield structure.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A reader structure, comprising:
    a first reader, including:
        a bottom shield:
        a sensor stack, including:
            a synthetic antiferromagnetic structure located between two side shields; and
            a sensor antiferromagnetic layer located directly adjacent to the synthetic antiferromagnetic structure and the bottom shield and between the bottom shield and the two side shields;
        a stack cap layer located directly adjacent to the sensor stack between the two side shields; and
        a top shield structure, the top shield structure comprising a synthetic antiferromagnetic shield structure magnetically coupled to the two side shields, including:
            a reference layer including at least a layer of NiFe and an impurity additive, the reference layer located directly adjacent to the stack cap layer and the two side shields;
            an RKKY coupling layer;
            a pinned layer; and
            isolation material located directly adjacent to the bottom shield, the sensor stack, the stack cap layer, and the top shield structure of the first reader, and located directly adjacent to the sides of each of the two side shields in a cross direction.

2. The reader structure of claim 1, further comprising a second reader positioned in the down track direction from the first reader, the second reader including:
    a sensor stack; and
    a top shield structure, the top shield structure comprising a synthetic antiferromagnetic shield structure, including:
        a reference layer including at least a layer of NiFe and an impurity additive;
        an RKKY coupling layer; and
        a pinned layer.

3. The reader structure of claim 1, wherein the impurity additive is oxygen.

4. The reader structure of claim 1, wherein the impurity additive is tungsten (W).

5. The reader structure of claim 4, wherein the content of W in the reference layer is less than 14 atomic percent.

6. The reader structure of claim 1, wherein the impurity additive is a refractory material.

7. The reader structure of claim 6, wherein the refractory material is at least one of tantalum, niobium, hafnium, and zirconium.

8. The reader structure of claim 1, wherein RKKY coupling layer has a thickness in a range of about 0-20 Å.

9. A storage device comprising:
    a magnetic media;
    a first reader, including:
        a bottom shield;
        a sensor stack, including:
            a synthetic antiferromagnetic structure located between two side shields; and
            a sensor antiferromagnetic layer located directly adjacent to the synthetic antiferromagnetic structure and the bottom shield and between the bottom shield and the two side shields;
a stack cap layer located directly adjacent to the sensor stack between the two side shields;
a top shield structure, the top shield structure comprising a synthetic antiferromagnetic shield structure magnetically coupled to the two side shields, including:
a reference layer including at least a layer of NiFe and an impurity additive, the reference layer located directly adjacent to the stack cap layer and the two side shields;
an RKKY coupling layer; and
a pinned layer; and
isolation material located directly adjacent to the bottom shield, the sensor stack, the stack cap layer, and the top shield structure of the first reader, and located directly adjacent to the sides of each of the two side shields in a cross direction.

10. The storage device of claim 9, further comprising:
a second reader positioned in the down track direction from the first reader, the second reader including:
a sensor stack; and
a top shield structure, the top shield structure comprising a synthetic; antiferromagnetic shield structure, including:
a reference layer including at least a layer of NiFe and an impurity additive;
an RKKY coupling layer; and
a pinned layer.

11. The storage device of claim 9, wherein the impurity additive is oxygen.

12. The storage device of claim 9, wherein the impurity additive is tungsten (W).

13. The storage device of claim 12, wherein the content of W in the reference layer is less than 14 atomic percent.

14. The storage device of claim 9, wherein the impurity additive is a refractory material.

15. The storage device of claim 14, wherein the refractory material is at least one of tantalum, niobium, hafnium, and zirconium.

16. The storage device of claim 9, wherein the RKKY coupling layer has a thickness in a range of about 0-20 Å.

* * * * *